United States Patent
Okayama

(10) Patent No.: US 8,208,772 B2
(45) Date of Patent: Jun. 26, 2012

(54) POLARIZATION INDEPENDENT DIRECTIONAL COUPLER AND RELATED OPTICAL DEVICES

(75) Inventor: Hideaki Okayama, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 232 days.

(21) Appl. No.: 12/801,235

(22) Filed: May 28, 2010

(65) Prior Publication Data

US 2011/0043817 A1    Feb. 24, 2011

(30) Foreign Application Priority Data

Aug. 19, 2009    (JP) ................... 2009-190209

(51) Int. Cl.
*G02B 6/26*    (2006.01)

(52) U.S. Cl. ........................................................ 385/42

(58) Field of Classification Search .................. None
See application file for complete search history.

(56) References Cited

U.S. PATENT DOCUMENTS

| | | | |
|---|---|---|---|
| 4,860,294 A | 8/1989 | Winzer et al. | |
| 5,764,826 A | 6/1998 | Kuhara et al. | |
| 5,960,135 A | 9/1999 | Ozawa | |
| 7,072,541 B2 | 7/2006 | Kim et al. | |
| 7,835,606 B2 * | 11/2010 | Okayama | 385/39 |
| 2004/0017990 A1 * | 1/2004 | Toofan et al. | 385/129 |
| 2005/0207705 A1 * | 9/2005 | Laurent-Lund | 385/45 |

FOREIGN PATENT DOCUMENTS

JP     08-163028 A    6/1996

* cited by examiner

*Primary Examiner* — Sung Pak
(74) *Attorney, Agent, or Firm* — Rabin & Berdo, P.C.

(57) ABSTRACT

An optical device has two optical waveguides embedded in a clad. The optical waveguides are mutually parallel and are separated by a distance that allows optical coupling between them. The optical waveguides have identical square cross sectional shapes in a plane orthogonal to the direction of light propagation, so that light propagates through each optical waveguide without polarization dependence. The length of each side of the square cross section of the optical waveguides is determined from the refractive index of the clad and the distance between the longitudinal axes of the optical waveguides so that coupling between the two optical waveguides is also polarization independent for light with a wavelength of 1.49 micrometers, which is the longer of the two wavelengths used in optical subscriber networks.

13 Claims, 14 Drawing Sheets

FIG.6

| DIRECTIONAL COUPLER | WAVELENGTH 1.49 μm | | TE WAVE | TM WAVE |
|---|---|---|---|---|
| | EQUIVALENT REFRACTIVE INDEX | $N_{eff0}$ : m = 0 (SYMMETRIC MODE) | 1.8173 | 1.8161 |
| | | $N_{eff1}$ : m = 1 (ANTI-SYMMETRIC MODE) | 1.7511 | 1.7503 |
| | $dN_{eff}$ : EQUIVALENT REFRACTIVE INDEX DIFFERENCE ($\lvert N_{eff0} - N_{eff1} \rvert$) | | 0.0662 | 0.0658 |
| | La : COUPLING LENGTH (μm) | | 11.2 | 11.2 |
| DIRECTIONAL COUPLER | WAVELENGTH 1.31 μm | | TE WAVE | TM WAVE |
| | EQUIVALENT REFRACTIVE INDEX | $N_{eff0}$ : m = 0 (SYMMETRIC MODE) | 2.1069 | 2.1085 |
| | | $N_{eff1}$ : m = 1 (ANTI-SYMMETRIC MODE) | 2.0928 | 2.0921 |
| | $dN_{eff}$ : EQUIVALENT REFRACTIVE INDEX DIFFERENCE ($\lvert N_{eff0} - N_{eff1} \rvert$) | | 0.0141 | 0.0163 |
| | La : COUPLING LENGTH (μm) | | 46.3 | 40.0 |

WAVEGUIDE DIMENSION s : 0.255 μm
AXIS-TO-AXIS SEPARATION G : 0.7 μm
REFRACTIVE INDEX n OF CLAD : 1.46 ($SiO_2$)

FIG.7

| DIRECTIONAL COUPLER | WAVELENGTH 1.49 μm | | TE WAVE | TM WAVE |
|---|---|---|---|---|
| | EQUIVALENT REFRACTIVE INDEX | $N_{eff0}$ : m = 0 (SYMMETRIC MODE) | 2.2012 | 2.1998 |
| | | $N_{eff1}$ : m = 1 (ANTI-SYMMETRIC MODE) | 2.1313 | 2.1300 |
| | $dN_{eff}$ : EQUIVALENT REFRACTIVE INDEX DIFFERENCE ($|N_{eff0} - N_{eff1}|$) | | 0.0699 | 0.0698 |
| | La : COUPLING LENGTH (μm) | | 10.6 | 10.7 |
| DIRECTIONAL COUPLER | WAVELENGTH 1.31 μm | | TE WAVE | TM WAVE |
| | EQUIVALENT REFRACTIVE INDEX | $N_{eff0}$ : m = 0 (SYMMETRIC MODE) | 2.4311 | 2.4327 |
| | | $N_{eff1}$ : m = 1 (ANTI-SYMMETRIC MODE) | 2.4089 | 2.4076 |
| | $dN_{eff}$ : EQUIVALENT REFRACTIVE INDEX DIFFERENCE ($|N_{eff0} - N_{eff1}|$) | | 0.0221 | 0.0251 |
| | La : COUPLING LENGTH (μm) | | 29.6 | 26.1 |

WAVEGUIDE DIMENSION s : 0.28 μm
AXIS-TO-AXIS SEPARATION G : 0.6 μm
REFRACTIVE INDEX n OF CLAD : 1.7 (SiON)

POLARIZATION INDEPENDENT DIRECTIONAL COUPLER AND RELATED OPTICAL DEVICES

BACKGROUND OF THE INVENTION

1. Field of the Invention

The present invention relates to a polarization independent silicon directional coupler and to various optical devices, such as a Mach-Zehnder interferometer and a ring resonator, that incorporate the directional coupler.

2. Description of the Related Art

In optical subscriber systems, since upstream communication (optical transmission from subscribers to the central office) and downstream communication (optical transmission from the central office to the subscribers) are carried on a single optical fiber, the upstream and downstream optical signals have different wavelengths. The central office and the subscriber equipment must therefore have optical wavelength filters for the corresponding wavelengths. In general, the optical subscriber equipment, referred to as an optical network unit (ONU), includes a light emitting element and a photodetector having optical axes that must be aligned through respective wavelength filters with the optical axes of an optical splitter/combiner when the equipment is assembled.

Recently, waveguide-type optical wavelength filters, which obviate the need for optical axis alignment, have been under study. Some known optical wavelength filters of this type use Mach-Zehnder interferometers, directional couplers, and grating reflectors, as disclosed in U.S. Pat. Nos. 4,860,294, 5,764,826, 5,960,135, and 7,072,541 and Japanese Patent Application Publication No. H8-163028.

Optical wavelength filters using Mach-Zehnder interferometers as described in the above patent documents have the advantage that their wavelength characteristics can be designed on the basis of optical circuit theory. The silicon Mach-Zehnder optical wavelength filters used in ONUs have the disadvantage, however, that their effective refractive index and coupling coefficient exhibit strong wavelength dependency, and there is also a polarization dependency that cannot be eliminated without special measures, such as varying the waveguide width in the directional coupler.

The inventor has found that polarization independent wavelength separation in the ONU wavelength band can be achieved by optimizing the dimensions of the two optical waveguides forming the directional coupler, including the distance between their central axes, with respect to the refractive index of the clad.

SUMMARY OF THE INVENTION

An object of the present invention is to provide a polarization independent silicon directional coupler suitable for the ONU wavelength range.

Another object of the invention is to provide various polarization independent optical devices using this type of directional coupler.

The invention provides a polarization independent directional coupler for coupling a mixed light signal including light with wavelengths of 1.31 micrometers (1.31 µm) and 1.49 micrometers (1.49 µm), which are the wavelengths used in ONU equipment. The directional coupler includes a clad in which two optical waveguides are embedded. Both optical waveguides are made of monocrystalline silicon. The central axes of the two optical waveguides, along which the mixed light signal propagates, are mutually parallel.

The clad has a refractive index n with a value in a first range from 1.46 to 2.0. The central axes of the two optical waveguides are separated by a distance G having a value in a second range from 0.6 µm to 0.9 µm. In a plane orthogonal to their central axes, the two optical waveguides have square cross sectional shapes with sides of a length s having a value in a third range from 0.21 µm to 0.35 µm. The dimension s is determined from the distance G and the clad index n.

Within the stated ranges, the axis-to-axis separation G and waveguide dimension s can be optimized with respect to the clad index n so that the directional coupler separates the light with a wavelength of 1.31 µm from the light with a wavelength of 1.49 µm without polarization dependence. More specifically, for the light with a wavelength of 1.49 µm, the difference between the coupling lengths of the transverse electric (TE) and transverse magnetic (TM) waves can be kept to 5% or less, which provides adequate polarization independence for practical use.

The clad may be made of silicon dioxide ($SiO_2$). Since the optical waveguides are made of silicon, the directional coupler can then be manufactured easily.

Alternatively, the clad may be made of silicon oxynitride (SiON). In comparison with an $SiO_2$ clad, an SiON clad relaxes the design constraints on the waveguide dimension s and increases its error tolerance, again allowing the directional coupler to be manufactured easily.

One or more directional couplers as described above may be used in various optical devices to perform polarization independent optical processing of the mixed light signal. One such optical device is a Mach-Zehnder interferometer, or a series of Mach-Zehnder interferometers, that performs polarization independent wavelength separation. Another such optical device is a ring resonator.

BRIEF DESCRIPTION OF THE DRAWINGS

In the attached drawings:

FIG. 6 is a table of optical parameters of the directional coupler in FIG. 1 with a silicon dioxide clad;

FIG. 7 is a table of optical parameters of the directional coupler in FIG. 1 with a silicon oxynitride clad;

DETAILED DESCRIPTION OF THE INVENTION

Figure 1:
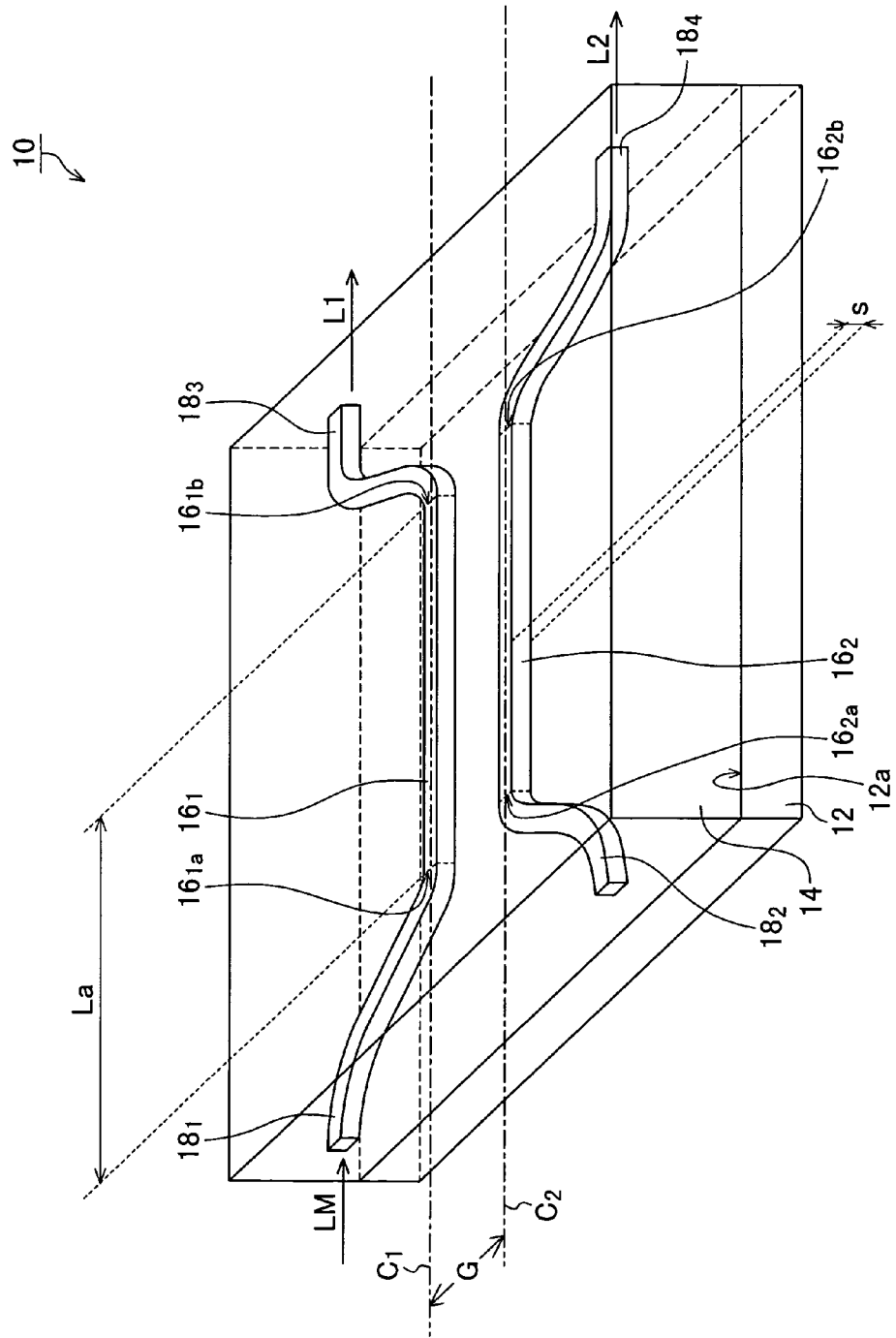
FIG. 1 is a schematic perspective view illustrating the structure of a directional coupler in a first embodiment of the invention.

Non-limiting embodiments of the invention will now be described with reference to the attached drawings, in which like elements are indicated by like reference characters, and in which sizes, shapes, and positional relationships are shown only schematically.

First Embodiment

Figure 2A:
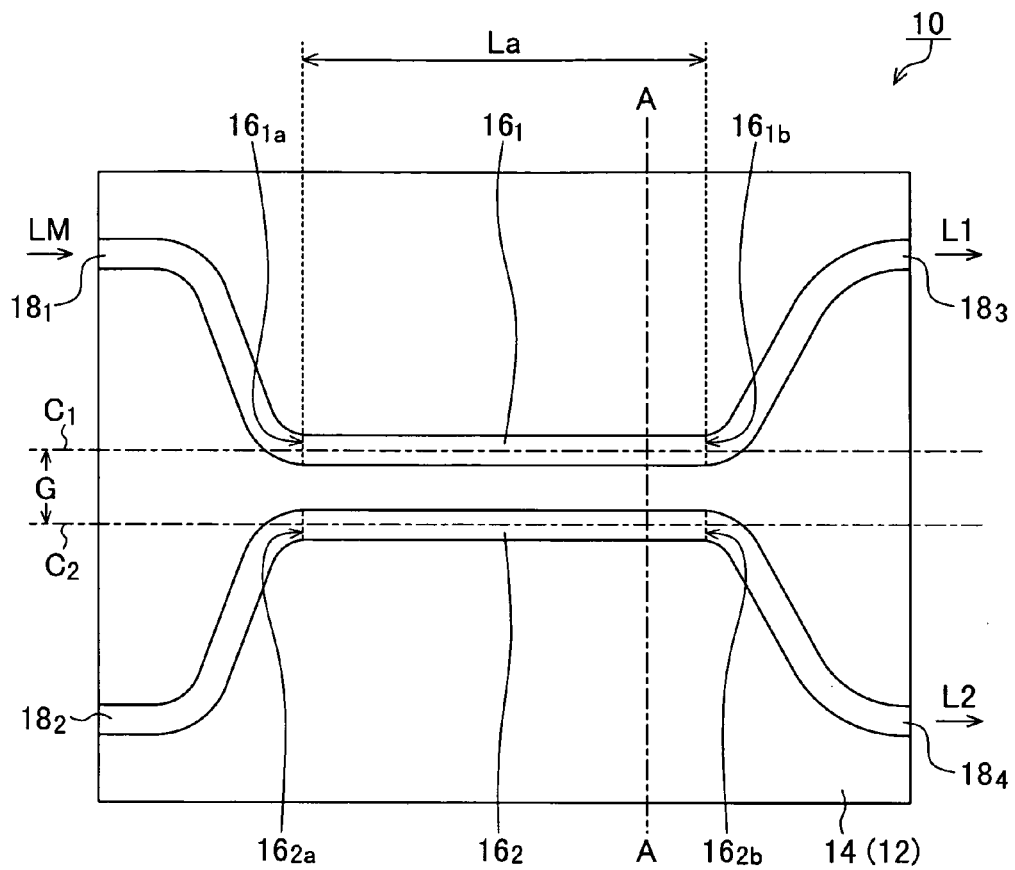
FIG. 2A is a schematic plan view of the directional coupler in FIG. 1.
Figure 2B:
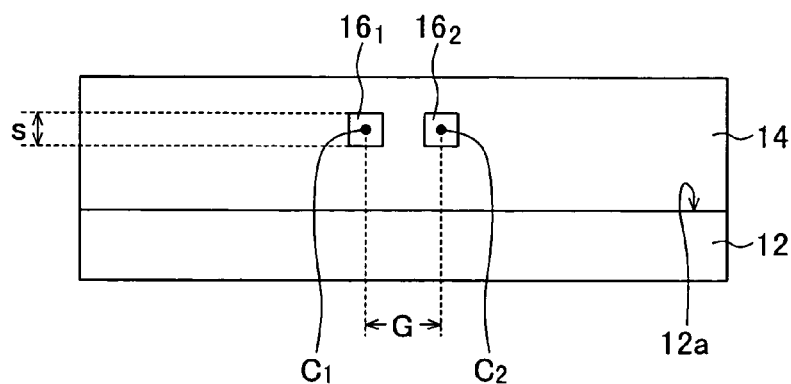
FIG. 2B is a sectional view of the directional coupler through line A-A in FIG. 2A.

The first embodiment is a directional coupler 10 with the structure shown in FIGS. 1, 2A, and 2B. For clarity, the directional coupler 10 is indicated by solid lines instead of phantom lines in FIGS. 1 and 2A, even though it is embedded in the clad 14 and would not be visible to the eye.

The directional coupler 10 includes a first optical waveguide $16_1$ and a second optical waveguide $16_2$ embedded in the clad 14, which is formed on a first major surface 12a of a substrate 12.

When a mixed light signal LM including first light L1 with a wavelength of 1.31 μm and second light L2 with a wavelength of 1.49 μm is input through the first optical waveguide $16_1$, the directional coupler 10 propagates the mixed light LM without polarization dependence and performs polarization independent wavelength separation: output of the first light L1 is from the first optical waveguide $16_1$; output of the second light L2 is from the second optical waveguide $16_2$.

The first light L1, which is input from the first optical waveguide $16_1$ and output from the first optical waveguide $16_1$ without a transfer of optical energy to the second optical waveguide $16_2$, will be described as being output in the bar state. The second light L2, which is input from the first optical waveguide $16_1$, transferred to the second optical waveguide $16_2$, and output from the second optical waveguide $16_2$, will be described as being output in the cross state.

The component elements of the directional coupler 10 will now be described in further detail.

In this exemplary embodiment, the substrate 12 is a rectangular parallel plate. The material of the substrate 12 is not particularly limited, but one preferred material is monocrystalline silicon.

The clad 14 is a generally slab-like layer formed on the first major surface 12a of the substrate 12. The refractive index n of the clad 14 is in the range from 1.46 to 2.0. One exemplary preferred material of the clad 14 is $SiO_2$ having a refractive index n of 1.46.

The thickness of the clad 14 in the space between the substrate 12 and the first and second optical waveguides $16_1$, $16_2$, that is, the distance between the lower surface of the first and second optical waveguides $16_1$, $16_2$ and the first major surface 12a of the substrate 12, should be great enough to keep light from leaking from the optical waveguides $16_1$, $16_2$ into the substrate 12. A preferred value of this distance is about 1 μm or more. In this embodiment, the thickness of the clad 14 in the space between the first and second optical waveguides $16_1$, $16_2$ and the substrate 12 is, for example, about 2 μm.

The first and second optical waveguides $16_1$, $16_2$ are mutually parallel channel optical waveguides made of monocrystalline silicon disposed in a plane parallel to the first major surface 12a of the substrate 12, placed close enough together to allow optical coupling between them.

The first optical waveguide $16_1$ extends straight from a first end $16_1$a to a second end $16_1$b, with a total length La. The second optical waveguide $16_2$ extends straight from a first end $16_2$a to a second end $16_2$b, with the same total length La.

The first end $16_1$a of the first optical waveguide $16_1$ and first end $16_2$a of the second optical waveguide $16_2$ are mutually aligned; that is, they are disposed in the same plane orthogonal to the direction of light propagation. The second end $16_1$b of the first optical waveguide $16_1$ and the second end $16_2$b of the second optical waveguide $16_2$ are similarly aligned in another plane orthogonal to the direction of light propagation.

The first and second optical waveguides $16_1$, $16_2$ are oriented so that their sides face each other along their total length La. The end-to-end length La of each of the first and second optical waveguides $16_1$, $16_2$ will also be referred to as the coupling length La, because it is the light propagation length in the directional coupler. An exemplary preferred value of the coupling length La in this embodiment is about 11.2 μm.

Given that the first light L1 has a wavelength of 1.31 μm and the second light L2 has a wavelength of 1.49 μm, the coupling length La is uniquely determined by the dimension s and axis-to-axis separation G of the waveguides and the refractive index n of the clad 14. Details will be given later.

The coupling length La is determined so as to match the coupling length of the second light L2, which has the longer wavelength (1.49 μm). This enables the second light L2 to be output in the cross state with a high extinction ratio, so that the directional coupler 10 can effectively separate the second light L2 from the first light L1. The first light L1 (wavelength 1.31 μm) need not be considered when the coupling length La is determined, for reasons that will be given later.

Both optical waveguides $16_1$, $16_2$ have the same square cross sectional shapes in a plane orthogonal to the light propagation direction, as shown in FIG. 2B. The length of each side of the square cross section will be referred to as the waveguide dimension s. The distance between the central axis $C_1$ of the first optical waveguide $16_1$ and the central axis $C_2$ of the second optical waveguide $16_2$ will be referred to as the axis-to-axis separation G.

The central axis $C_1$ of the first optical waveguide $16_1$ and the central axis $C_2$ of the second optical waveguide $16_2$ are straight lines formed by connecting the points of intersection of two diagonals of the corresponding square cross sections in the longitudinal direction of the waveguide.

The axis-to-axis separation G should be in the range from 0.6 μm to 0.9 μm. In this exemplary embodiment, one preferred value of the axis-to-axis separation G is 0.7 μm.

The waveguide dimension s has a value in the range from 0.21 μm to 0.35 μm. For an $SiO_2$ clad 14 and a 0.7 μm axis-to-axis separation G, a preferred value of the waveguide dimension s in this embodiment is about 0.255 μm. Detailed design conditions for G and s will be given later.

Specific center-to-center separations G and waveguide dimensions s in the ranges given above enable the directional coupler 10 to perform polarization independent wavelength separation of first light L1 with a wavelength of 1.31 μm and second light L2 with a wavelength of 1.49 μm.

Polarization independence means that the TE and TM components of the second light L2 are coupled at the same rate in the directional coupler 10, so that the TE and TM components are both completely coupled after propagation through the same distance in the directional coupler 10. This distance will also be referred to as the coupling length of the second light L2. The reason why the first light L1 is not considered in this definition will be explained later.

The first optical waveguide $16_1$ is connected to a pair of input-output waveguides $18_1$, $18_3$, and the second optical waveguide $16_2$ is connected to another pair of input-output waveguides $18_2$, $18_4$. The input-output waveguides $18_1$ to $18_4$ are channel optical waveguides with the same cross sectional shapes and dimensions as the first and second optical waveguides $16_1$, $16_2$.

Input-output waveguide $18_1$ is optically connected to the first end $16_1a$ of the first optical waveguide $16_1$. Input-output waveguide $18_3$ is optically connected to the second end $16_1b$ of the first optical waveguide $16_1$. Input-output waveguide $18_2$ is optically connected to the first end $16_2a$ of the second optical waveguide $16_2$. Input-output waveguide $18_4$ is optically connected to the second end $16_2b$ of the second optical waveguide $16_2$.

The operation of the directional coupler 10 will be described with reference to FIGS. 1 and 2A.

Mixed light LM including the first light L1 and second light L2 is input to input-output waveguide $18_1$, propagates toward the directional coupler 10, and reaches the first optical waveguide $16_1$.

Because the first and second optical waveguides $16_1$, $16_2$ are mutually parallel and spaced apart by a distance that allows optical coupling, optical energy is transferred from the first optical waveguide $16_1$ to the second optical waveguide $16_2$. The transfer takes place gradually as the light propagates through the directional coupler 10 for its coupling length La.

Because the coupling length La of the directional coupler 10 matches the coupling length of both the TE and TM components of the second light L2, all of the optical energy of the second light L2 propagating through the first optical waveguide $16_1$ is transferred to the second optical waveguide $16_2$. The second light L2 is therefore output from input-output waveguide $18_4$, in the cross state, regardless of its polarization.

Because the coupling length La of the directional coupler 10 differs greatly from the coupling length of the first light L1, which has a wavelength of 1.31 µm, substantially none of the optical energy of the first light L1 is transferred to the second optical waveguide $16_2$. For the most part, the first light L1 propagates directly through the first optical waveguide $16_1$ and is output from input-output waveguide $18_3$ in the bar state.

The directional coupler 10 therefore performs polarization independent wavelength separation of the first light L1 and second light L2.

The reason why the first light L1, which has a wavelength of 1.31 µm, is not considered when the coupling length La is designed will now be described.

The coupling length of directional couplers made of monocrystalline silicon, as in this embodiment, is known to have a strong wavelength dependence. The coupling length of the first light L1, which has a wavelength of 1.31 µm in this embodiment, is three or four times greater than the coupling length of the second light L2, which has a wavelength of 1.49 µm.

In the directional coupler 10, coupling at the 1.31-µm wavelength of the first light L1 is much weaker than coupling at the 1.49-µm wavelength of the second light L2. As the mixed light propagates through the distance La, regardless of its polarization, only a comparatively small fraction of the optical energy of the first light L1 is transferred from the first optical waveguide $16_1$ to the second optical waveguide $16_2$ while substantially all of the optical energy of the second light L2 is transferred from the first optical waveguide $16_1$ to the second optical waveguide $16_2$. The directional coupler 10 therefore outputs the first light L1 in the bar state and the second light L2 in the cross state, regardless of polarization.

It is known also that a directional coupler with good output characteristics, i.e., a high extinction ratio, in the cross state generally requires a precisely matched coupling length, while a high extinction ratio in the bar state can be achieved without precise matching of the coupling length. The coupling length La of the directional coupler 10 must therefore satisfy stringent conditions with respect to the 1.49-µm wavelength of the second light L2, but does not have to satisfy any stringent conditions with respect to the 1.31-µm wavelength of the first light L1. This is the reason why the first light L1 is not considered when the coupling length La is designed.

For substantially the same reason, the first light L1 is not considered in the definition of polarization independence. If polarization independence for the second light L2 is achieved by specifying a precise coupling length La for the second light L2, adequate polarization independence for practical use is achieved automatically for the first light L1, which does not have stringent design conditions.

The design conditions of the waveguide dimension s and the axis-to-axis separation G will now be described with reference to FIG. 3, in which the horizontal axis represents the clad index n (nondimensional), and the vertical axis represents the waveguide dimension s in micrometers.

Figure 3:
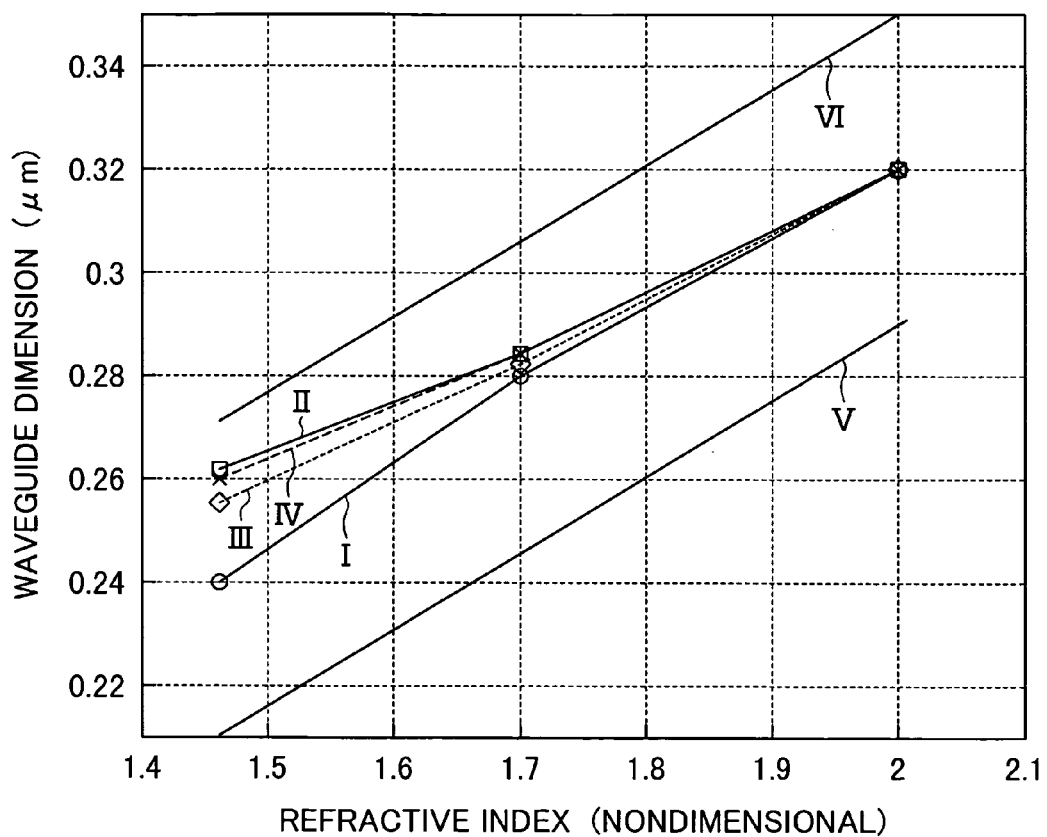
FIGS. 3 and 4 are graphs illustrating relationships between the waveguide dimension, axis-to-axis separation, and clad index n for achieving optimized polarization independence in the directional coupler in the first embodiment.

The graph in FIG. 3 was obtained by calculating the waveguide dimension s that makes the second light L2 (wavelength 1.49 µm) polarization independent with respect to a given axis-to-axis separation G and clad index n. The calculation was carried out by eigenmode analysis, using the finite element method. Only the second light L2 was considered, for the reason given above. The refractive index of the monocrystalline silicon used in the first and second optical waveguides $16_1$, $16_2$ was calculated from Sellmeier's equation, thereby taking the wavelength dependency of the refractive index into consideration.

Curve I in FIG. 3 represents the relationship when the axis-to-axis separation G is 0.6 µm. Curve II represents the relationship when the axis-to-axis separation G is 0.9 µm. Curve III represents the relationship when the axis-to-axis separation G is 0.7 µm. Curve IV represents the relationship when the axis-to-axis separation G is 0.8 µm.

In the range of clad index values n from 1.46 to 2.0, curves I to IV remain between approximation lines V and VI. In the area between approximation lines V and VI, the difference in coupling length between the TE wave and TM wave of the second light L2 is 5% or less, and adequate polarization independence for practical use is achieved. Approximation line V is given by the equation $$s=0.148n-0.006,$$

while approximation line VI is given by the equation $$s=0.148n+0.054.$$

The two approximation lines are linear functions obtained by the well known least squares method.

The waveguide dimension s for achieving polarization independence is given by a point in the area determined by the following expression (1) between approximation lines V and VI.

$$0.148n-0.006<s<0.148n+0.054 \quad (1)$$

The area defined by expression (1) is wider than the range including curves I to IV and appears to include an invalid (polarization-dependent) part, such as the point where n is 1.5 and s is 0.24. Actually, this part is not invalid but is the result of considering the operating temperature range (10° C. to 80° C.) of the directional coupler 10. Because the refractive indexes of the clad 14 and of the first and second optical waveguides $16_1, 16_2$ are temperature dependent, the approximation lines V and VI allow for index variations caused by temperature variations. In contrast, curves I to IV were calculated on the assumption that the directional coupler 10 operates at a constant room temperature of about 25° C.

The design conditions of the waveguide dimension s and axis-to-axis separation G will be described with reference to FIG. 4, in which the horizontal axis represents the axis-to-axis separation G in micrometers, and the vertical axis represents the waveguide dimension s in micrometers. The curves in FIG. 4 were obtained by the same calculation methods as used in FIG. 3.

Figure 4:
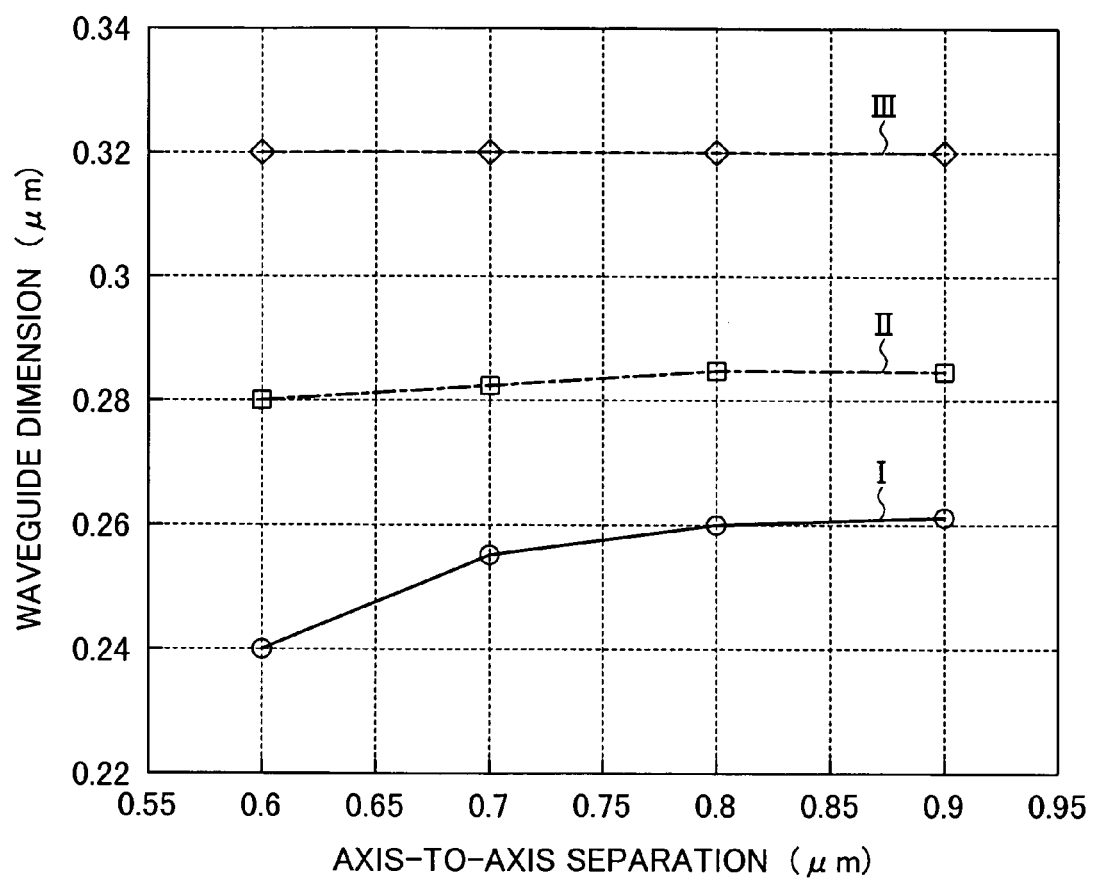

Curve I in FIG. 4 represents the relationship when the clad index n is 1.46, curve II represents the relationship when the clad index n is 1.7, and curve III represents the relationship when the clad index n is 2.0.

Curve I indicates that the waveguide dimension s for achieving polarization independence increase monotonically in the range from 0.24 μm to 0.262 μm as the axis-to-axis separation G increases from 0.6 μm to 0.9 μm.

Curve II indicates that the waveguide dimension s for achieving polarization independence increases monotonically from 0.28 μm to 0.285 μm as the axis-to-axis separation G increases from 0.6 μm to 0.9 μm.

Curve III indicates that the waveguide dimension s for achieving polarization independence remains constant at about 0.32 μm as the axis-to-axis separation G increases from 0.6 to 0.9 μm.

Curves I to III indicate that the waveguide dimension s for achieving polarization independence tends to increase as the clad index n increases. If the clad index n is 1.46, the mean value of the waveguide dimension s is about 0.255 μm over the axis-to-axis separation G range from 0.6 to 0.9 μm. If the clad index n is 1.7, the mean value of the waveguide dimension s is about 0.282 μm over the axis-to-axis separation G range from 0.6 to 0.9 μm. If the clad index n is 2.0, the mean value of the waveguide dimension s is about 0.32 μm over the axis-to-axis separation G range from 0.6 to 0.9 μm.

These data indicate that an increase in clad index n enlarges the necessary cross sections of the first and second optical waveguides $16_1, 16_2$ in the directional coupler 10, making the directional coupler easier to manufacture.

As the clad index n increases, the rate of change in the waveguide dimension s with respect to the axis-to-axis separation G decreases. If the refractive index n is 1.46, the waveguide dimension s increases by about 0.022 μm (=0.262−0.24) while the axis-to-axis separation G changes from 0.6 to 0.9 μm. If the refractive index n is 1.7, the waveguide dimension s increases by about 0.002 μm (=0.282−0.28) while the axis-to-axis separation G changes from 0.6 to 0.9 μm. If the refractive index n is 2.0, the waveguide dimension s remains constant at 0.32 μm while the axis-to-axis separation G changes from 0.6 to 0.9 μm.

As the clad index n increases, accordingly, the permissible dimensional error in the first and second optical waveguides $16_1$ and $16_2$ increases, making it easier to manufacture the directional coupler.

The relationship between the waveguide dimension s and the coupling length La will be described with reference to FIG. 5, in which the horizontal axis represents the axis-to-axis separation G in micrometers, the left vertical axis represents the waveguide dimension s in micrometers, and the right vertical axis represents the coupling length La in micrometers.

Figure 5:
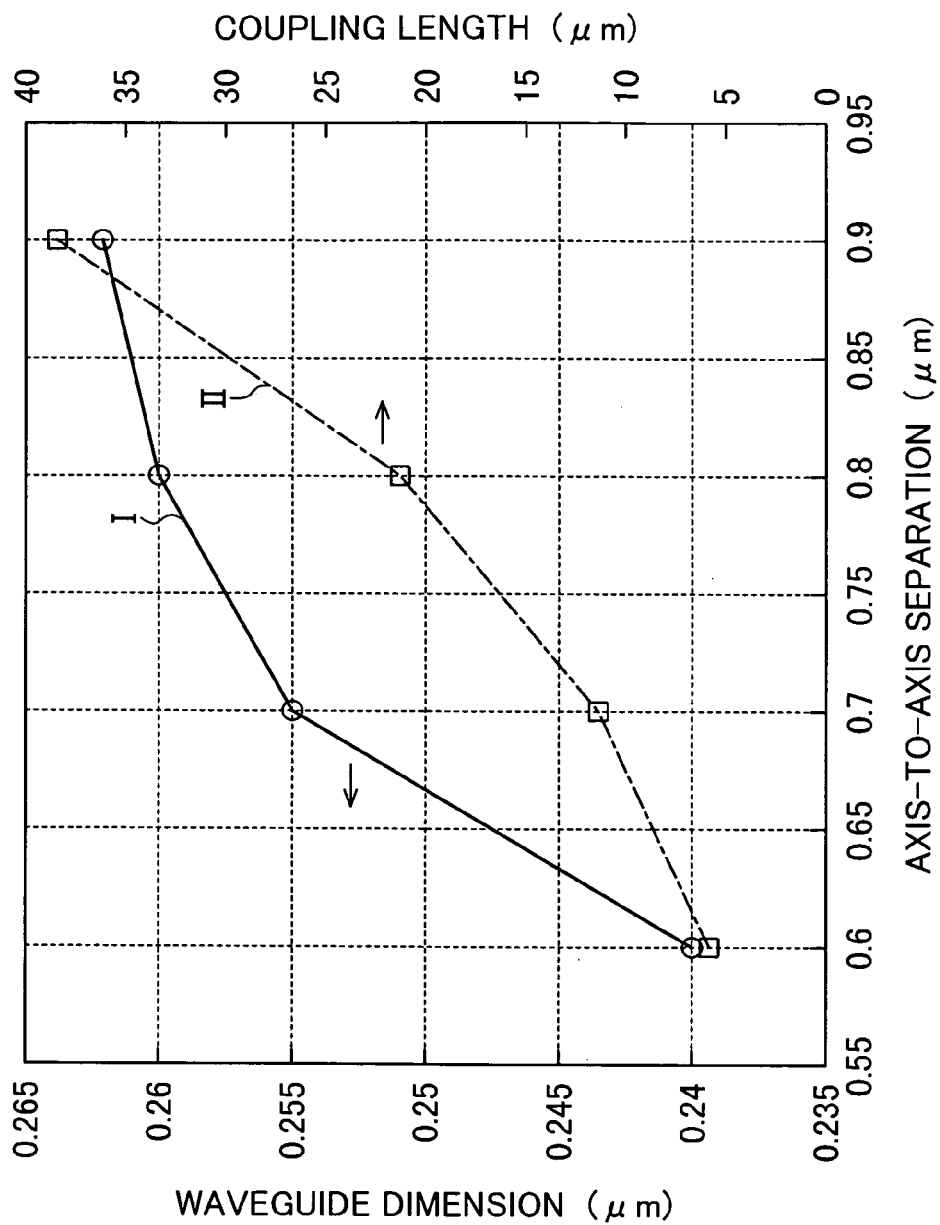
FIG. 5 is a graph illustrating relationships among the waveguide dimension s, axis-to-axis separation G, and coupling length La for achieving optimized polarization independence in the first embodiment.

Curve I in FIG. 5 is the same as curve I in FIG. 4, although with a different scale on the left vertical axis.

Curve I represents the relationship between the axis-to-axis separation G and the waveguide dimension s that gives polarization independence when the clad index n is 1.46.

Curve II represents the coupling length La of the directional coupler 10 required for polarization independent wavelength separation of the first light L1 and second light L2 when the waveguide dimension s varies along curve I. The coupling length La in curve II was calculated from the difference in equivalent refractive index of the directional coupler 10 between the symmetric mode and the anti-symmetric mode by established methods. FIG. 5 shows that there is a single optimum coupling length La for each point on curve I.

The effects of the directional coupler 10 will be described with reference to FIGS. 6, 7, 8A, and 8B.

The tables in FIGS. 6 and 7 show the equivalent refractive index and the coupling length La of the directional coupler 10 for the TE and TM waves, calculated by eigenmode analysis, using the finite element method, for first light L1 with a wavelength of 1.31 μm and second light L2 with a wavelength of 1.49 μm.

FIG. 6 gives results of calculations for a directional coupler 10 designed with a waveguide dimension s of 0.255 μm, an axis-to-axis separation G of 0.7 μm, and a clad index n of 1.46 ($SiO_2$). These conditions satisfy the requirements for polarization independence shown in FIG. 3.

FIG. 7 gives results of calculations for a directional coupler 10 designed with a waveguide dimension s of 0.28 μm, an axis-to-axis separation G of 0.6 μm, and a clad index n of 1.7. These conditions also satisfy the requirements for polarization independence shown in FIG. 3. Materials with a refractive index n of 1.7 include silicon oxynitride (SiON).

In FIGS. 6 and 7, $N_{eff0}$ is the equivalent refractive index of directional coupler 10 for symmetric mode light having a mode number m of zero; $N_{eff1}$ is the equivalent refractive index of directional coupler 10 for anti-symmetric mode light having a mode number m of one; $dN_{eff}$ is the absolute value of the difference between $N_{eff0}$ and $N_{eff1}$; La is the coupling length of directional coupler 10, obtained from the values of $N_{eff0}, N_{eff1}$, and $dN_{eff}$. All of these values are calculated separately for the TE and TM waves.

The values of La for the second light L2 with a wavelength of 1.49 μm in FIG. 6 indicate that the polarization-dependent difference in coupling length La in the directional coupler 10 is within 1%. As the TE and TM waves propagate through these substantially equal coupling lengths La, the TE and TM waves equally undergo a transfer of optical energy from the first optical waveguide $16_1$ to the second optical waveguide $16_2$. The directional coupler 10 accordingly achieves polarization independent output of the second light L2 in the cross state.

The values of La for the first light L1 with a wavelength of 1.31 μm in FIG. 6 indicate a polarization-dependent difference in coupling length La in the directional coupler 10 of about 15%. These data may not seem to indicate a sufficient level of polarization independence for the first light L1, but since most of the first light L1 is not coupled but is output from the directional coupler 10 in the bar state, the design constraints on the directional coupler 10 in relation to the first light L1 are very loose, and the values in FIG. 6 indicate that polarization independence for the first light L1 is adequate for practical use.

The values of La for the second light L2 in FIG. 7 indicate that the polarization-dependent difference in coupling length La in the directional coupler 10 is within 1%, indicating that a directional coupler 10 with dimensions as indicated in FIG. 7 achieves polarization independent output of the second light L2 in the cross state.

The values of La for the first light L1 in FIG. 7 indicate that the polarization-dependent difference in coupling length La in the directional coupler 10 is about 10%, which is less than the 15% difference in FIG. 6. Accordingly, a directional coupler 10 with dimensions as indicated in FIG. 7 also achieves adequate polarization independence for the first light L1 in practical use.

Figure 8A:
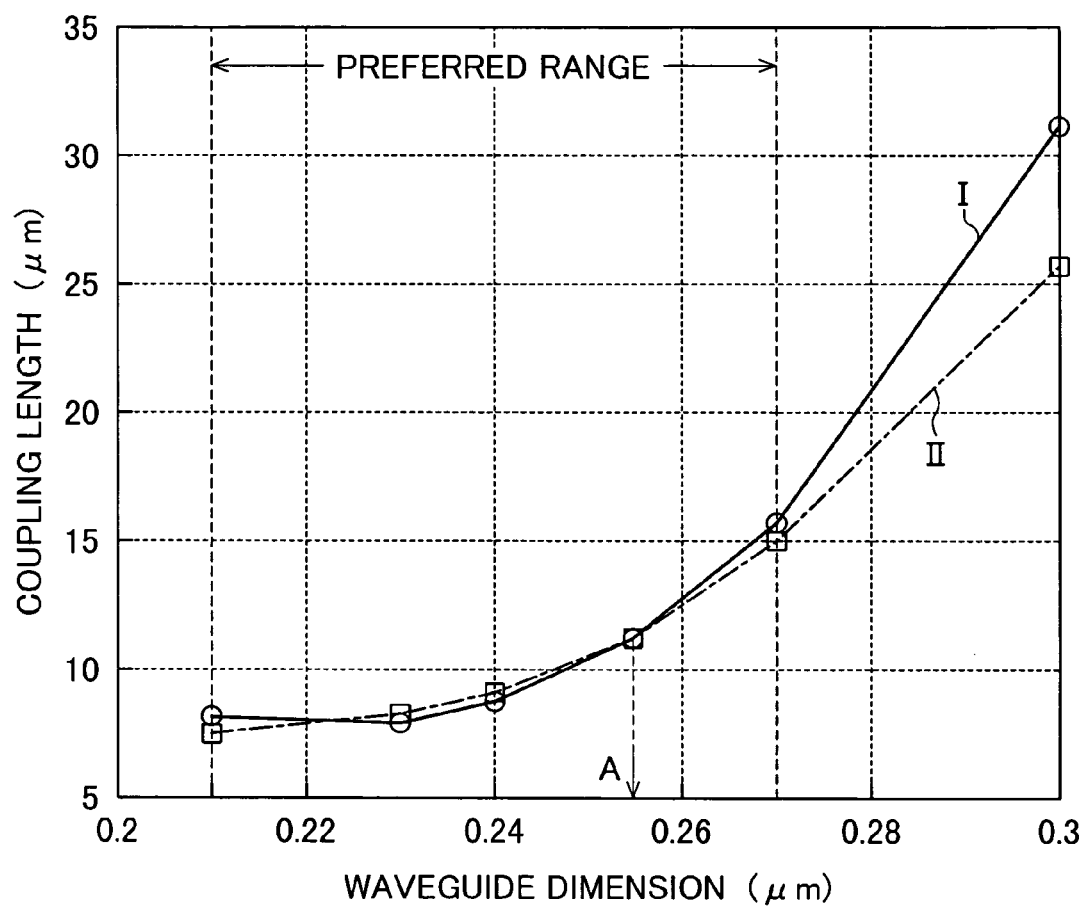
FIGS. 8A and 8B are graphs illustrating variations in the coupling length of TE and TM waves of the second light L2 when the dimensions of the two optical waveguides are varied.
Figure 8B:
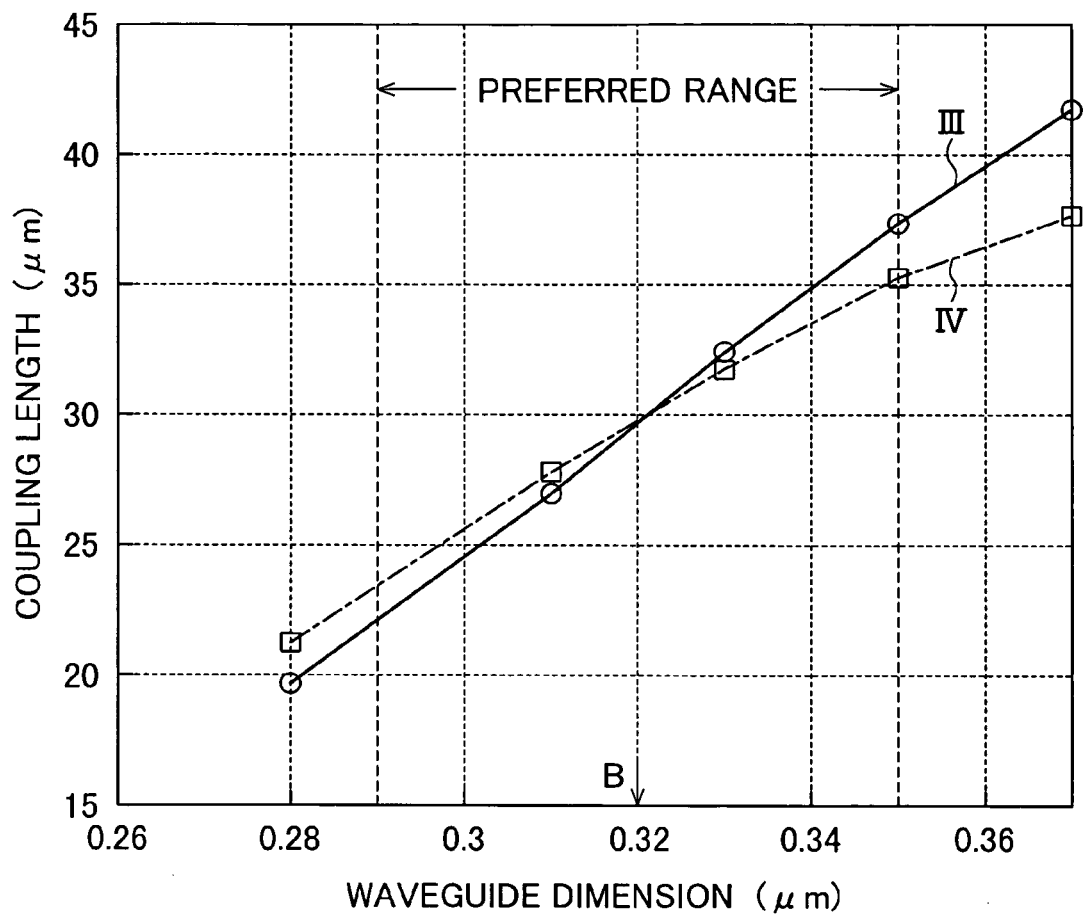

In FIGS. 8A and 8B, the vertical axis represents the coupling length of the second light L2 in micrometers, and the horizontal axis represents the waveguide dimension s in micrometers. The coupling lengths were calculated by the same method as used to calculate the values of La in FIGS. 6 and 7.

The graph in FIG. 8A was obtained with the clad index n set to 1.46 and the axis-to-axis separation set to 0.7 μm. Under these conditions, according to FIG. 5, the optimum value of the waveguide dimension s is 0.255 μm.

In FIG. 8A, curve I represents the coupling length for the TE wave of the second light L2, and curve II represents the coupling length for the TM wave of the second light L2. Arrow A indicates the optimum waveguide dimension s (0.255 μm). The dashed lines to the left and right of arrow A indicate that the preferred range of the waveguide dimension defined by expression (1) under these design conditions is 0.21 to 0.27 μm.

FIG. 8A indicates that if the waveguide dimension s is within the range defined by expression (1), the difference in coupling length between the TE and TM waves is within ±5%. As the waveguide dimension s increases or decreases beyond that range, the difference in coupling length increases. When the value of s is 0.30 μm, for example, the difference in coupling length increases to about 20%.

Calculations were not carried out for waveguide dimensions s below 0.21 μm because the directional coupler 10 does not operate normally in that range.

The graph in FIG. 8B was obtained with the clad index n set to 2.0 and the axis-to-axis separation set to 0.7 μm. Under these conditions, according to FIG. 4, the optimum value of the waveguide dimension s is 0.32 μm.

Curve III in FIG. 8B represents the coupling length for the TE wave of the second light L2, and curve IV represents the coupling length for the TM wave of the second light L2. Arrow B indicates the optimum waveguide dimension s (0.32 μm). The dashed lines to the left and right of arrow B indicate the preferred range (0.29 to 0.35 μm) of the waveguide dimension defined by expression (1) under these design conditions.

FIG. 8B indicates that if the waveguide dimension s is within the range defined by expression (1), the difference in coupling length between the TE and TM waves is within ±5%. As the waveguide dimension s increases or decreases beyond that range, the difference in coupling length increases. When the value of s is 0.37 μm, for example, the difference in coupling length reaches about 10%.

As shown by FIGS. 6, 7, 8A, and 8B, the directional coupler in this embodiment can perform wavelength separation of first light L1 having a wavelength of 1.31 μm and second light L2 having a wavelength of 1.49 μm, the wavelengths used in ONU equipment, with adequate polarization independence for practical use.

Second Embodiment

Figure 9:
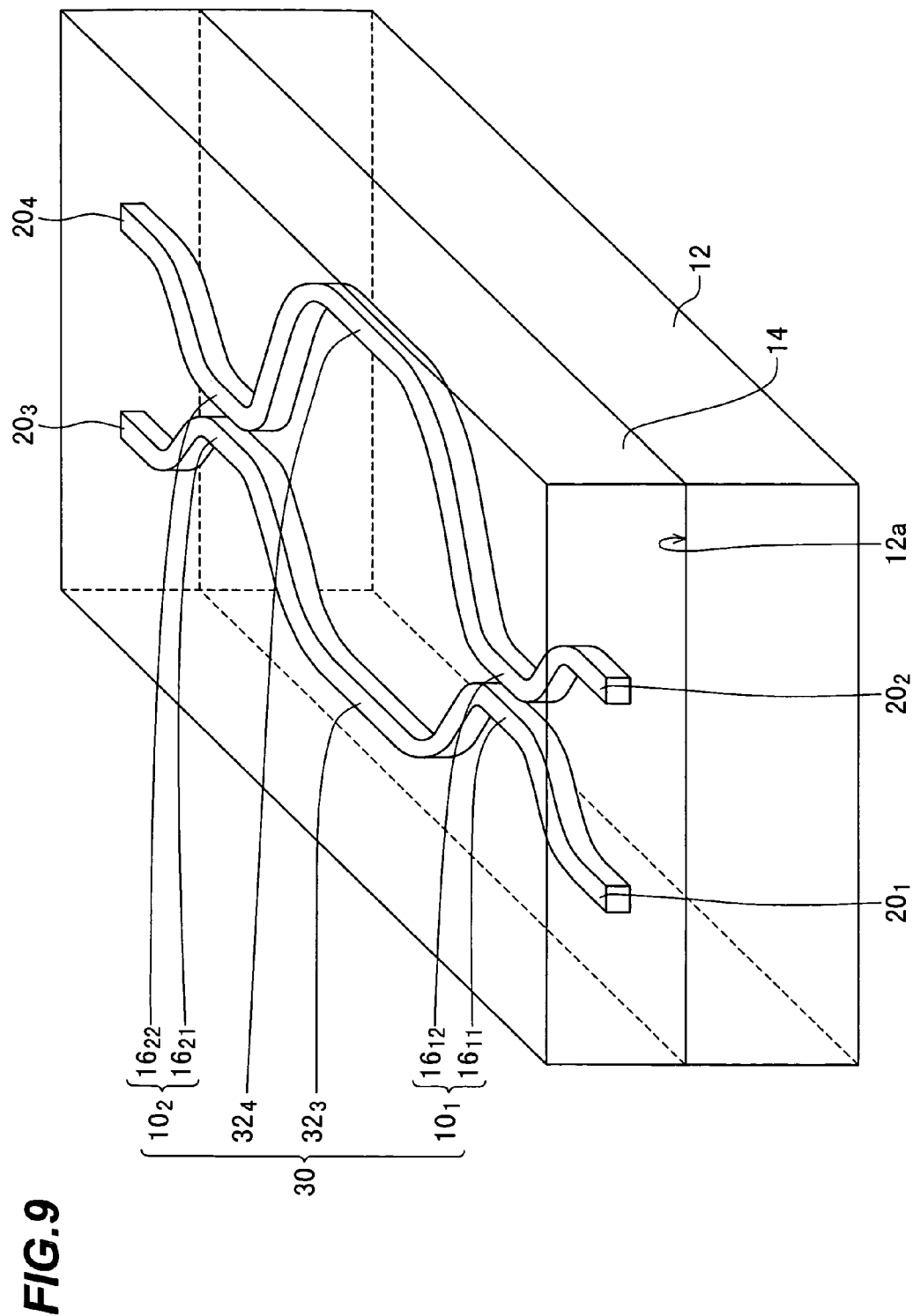
FIG. 9 is a schematic perspective view illustrating the structure of a Mach-Zehnder interferometer in a second embodiment of the invention.
Figure 10:
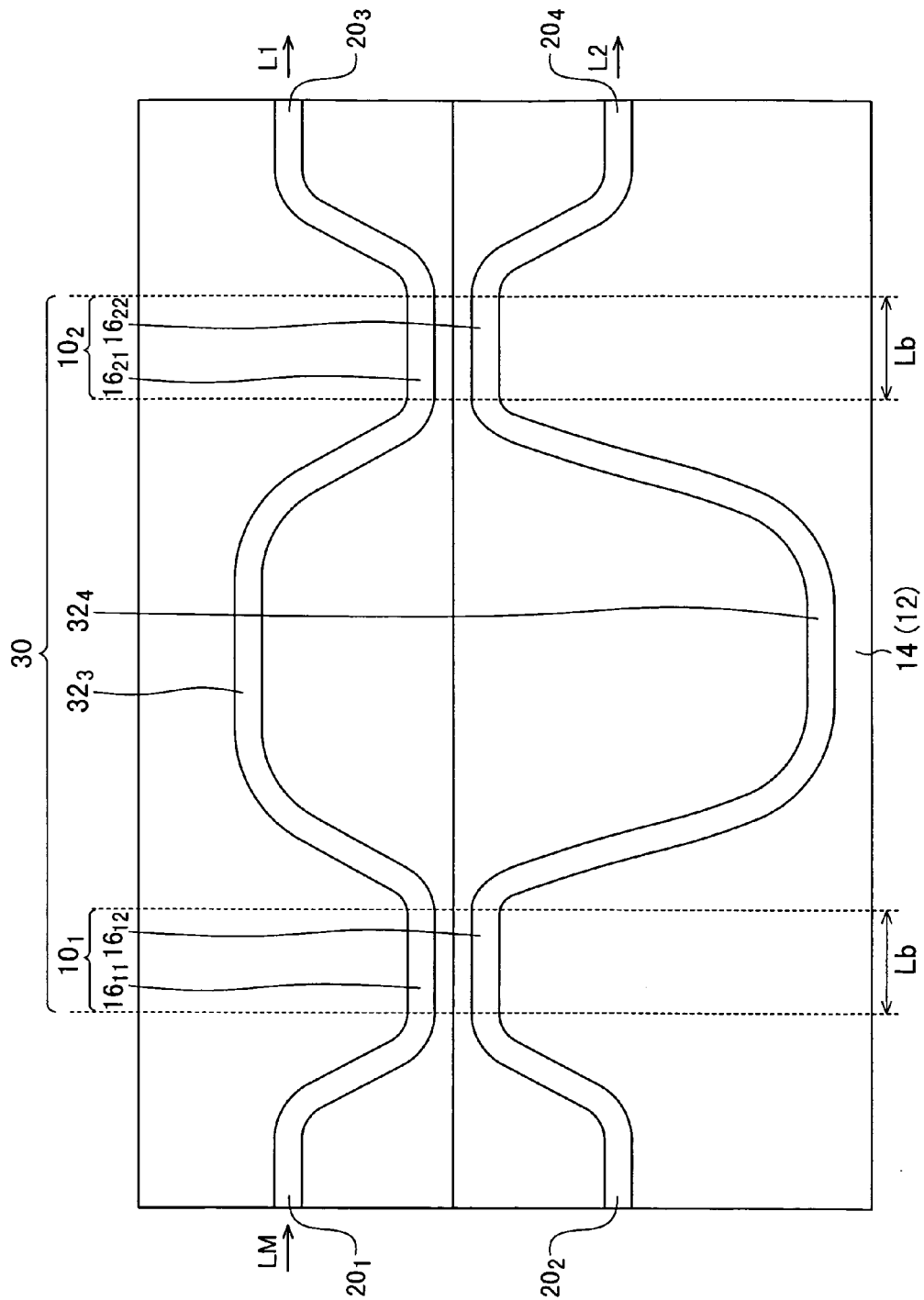
FIG. 10 is a schematic plan view of the Mach-Zehnder interferometer in FIG. 9.

The second embodiment is a Mach-Zehnder interferometer 30 with the structure shown in FIGS. 9 and 10. For clarity, the Mach-Zehnder interferometer 30 is indicated by solid lines instead of phantom lines in FIGS. 9 and 10, even though it is embedded in a clad 14 and would not be visible to the eye.

The Mach-Zehnder interferometer 30 includes a first directional coupler $10_1$ and a second directional coupler $10_2$ having respective first optical waveguides $16_{11}$, $16_{21}$ and second optical waveguides $16_{12}$, $16_{22}$ with the cross-sectional structure shown in FIG. 2B. The Mach-Zehnder interferometer 30 also includes a third optical waveguide $32_3$ and a fourth optical waveguide $32_4$ having the same cross-sectional structure as the first and second optical waveguides $16_{11}$, $16_{21}$, $16_{12}$, $16_{22}$ in any plane orthogonal to the direction of light propagation.

The Mach-Zehnder interferometer 30 separates a mixed light signal LM including first light L1 and second light L2 input to first optical waveguide $16_{11}$, outputs the first light L1 in the bar state from second optical waveguide $16_{21}$, and outputs the second light L2 in the cross state from second optical waveguide $16_{22}$.

Like the directional coupler 10 in the first embodiment, the Mach-Zehnder interferometer 30 is embedded in a clad 14 formed on a first major surface 12a of a substrate 12. The Mach-Zehnder interferometer 30 is also made of monocrystalline silicon. Its constituent elements will now be described in more detail.

The first and second directional couplers $10_1$, $10_2$ have the same structure as the directional coupler 10 in the first embodiment except that their coupling length Lb is one-half the coupling length La of directional coupler 10 (Lb=La/2).

The coupling length of the first and second directional couplers $10_1$, $10_2$ is reduced to Lb because when propagation through the first directional coupler $10_1$ and second directional coupler $10_2$ is completed, the total coupled distance of the second light L2 becomes La, and the second light L2 is output completely in the cross state.

First and second optical waveguides $16_{11}$ and $16_{12}$ are located in the first directional coupler $10_1$. First and second optical waveguides $16_{21}$ and $16_{22}$ are located in the second directional coupler $10_2$.

The third and fourth optical waveguides $32_3$, $32_4$ are channel optical waveguides made of monocrystalline silicon and have identical cross-sectional structures but different optical path lengths. In this embodiment, the third optical waveguide $32_3$ has a shorter optical path length than the fourth optical waveguide $32_4$.

The difference in optical path length between the third and fourth optical waveguides $32_3$, $32_4$ will be denoted ΔL. The value of ΔL is determined so that the phase difference of the first light L1 after propagation through the third and fourth optical waveguides $32_3$, $32_4$ is π+2 mπ, where m is a positive integer, and the phase difference of the second light L2 after propagation through the third and fourth optical waveguides $32_3$, $32_4$ is 2 mπ. The reason for determining the optical path difference ΔL between the third and fourth optical waveguides $32_3$, $32_4$ as described above will be explained later.

The third optical waveguide $32_3$ optically connects the first optical waveguide $16_{11}$ of the first directional coupler $10_1$ to the first optical waveguide $16_{21}$ of the second directional coupler $10_2$. The fourth optical waveguide $32_4$ optically connects the second optical waveguide $16_{12}$ of the first directional coupler $10_1$ to the second optical waveguide $16_{22}$ of the second directional coupler $10_2$.

The cross-sectional shapes of the third and fourth optical waveguides $32_3$, $32_4$ in any plane orthogonal to the direction of light propagation are square with the same dimensions as the optical waveguides $16_{11}$, $16_{12}$, $16_{21}$, $16_{22}$ in the directional couplers. Because of their square cross-sectional shape, the third and fourth optical waveguides $32_3$, $32_4$ propagate the first light L1 and second light L2 without polarization dependence.

The optical waveguides $16_{11}$, $16_{12}$ in the first directional coupler $10_1$ are connected respectively to a first input optical waveguide $20_1$ and a second input optical waveguide $20_2$. The optical waveguides $16_{21}$, $16_{22}$ in the second directional coupler $10_2$ are connected respectively to a first output optical waveguide $20_3$ and a second output optical waveguide $20_4$. The input and output optical waveguides $20_1$, $20_2$, $20_3$, $20_4$ are also channel optical waveguides.

The operation of the Mach-Zehnder interferometer 30 will be described with reference to the plan view in FIG. 10.

An input mixed light signal LM including first light L1 and second light L2 propagates through the first input optical waveguide $20_1$ to the first directional coupler $10_1$.

The first directional coupler $10_1$ has a coupling length Lb (=La/2) optimized for output of the second light L2 in the cross state, as described above. In the process of propagation through the first directional coupler $10_1$, the optical energy of the second light L2 becomes equally divided between the first optical waveguide $16_{11}$ and the second optical waveguide $16_{12}$. The second light L2 then propagates through the third and fourth optical waveguides $32_3$, $32_4$ with equal intensity.

The coupling length Lb of the first directional coupler $10_1$ is not optimized for the first light L1, which has a wavelength of 1.31 μm. In the process of propagation through the first directional coupler $10_1$, only a small amount of the optical energy of the first light L1 is transferred to the second optical waveguide $16_{12}$. Accordingly, the intensity of the first light L1 in the first optical waveguide $16_{11}$ is much greater than the intensity of the first light L1 second optical waveguide $16_{12}$ (L1 intensity in first optical waveguide $16_{11}$ >> L1 intensity in second optical waveguide $16_{12}$). The first light L1 maintains this intensity relationship during its propagation through the third and fourth optical waveguides $32_3$, $32_4$.

The optical path length difference between the third and fourth optical waveguides $32_3$, $32_4$ for the second light L2 is 2 mπ times the wavelength of 1.49 μm. Therefore, when the second light L2 reaches the second directional coupler $10_2$, the components propagating through the third and fourth optical waveguides $32_3$, $32_4$ are in phase and interfere constructively. In the process of propagation through the second directional coupler $10_2$, the remaining optical energy of the second light L2 is transferred from the first optical waveguide $16_{21}$ to the second optical waveguide $16_{22}$ and the second light L2 is output from the second output optical waveguide $20_4$ in the cross state.

The optical path length difference between the third and fourth optical waveguides $32_3$, $32_4$ is π+2 mπ times the wavelength (1.31 μm) of the first light L1. Therefore, when the first light L1 reaches the second directional coupler $10_2$, the components propagating through the third and fourth optical waveguides $32_3$, $32_4$ are in opposite phase and interfere destructively. As a result, the relatively weaker component propagating through the fourth optical waveguide $32_4$ is lost.

Since the coupling length Lb of the second directional coupler $10_2$ is not optimized for the first light L1, in the process of propagation through the second directional coupler $10_2$, little energy is transferred from the first optical waveguide $16_{21}$ to the second optical waveguide $16_{22}$. Therefore, the first light L1 propagates through the first optical waveguide $16_{21}$ and is output from the first output optical waveguide $20_3$ in the bar state.

The second embodiment has the following effects.

The Mach-Zehnder interferometer 30 combines the polarization independent directional coupler 10 of the first embodiment with polarization independent channel optical waveguides as the third and fourth optical waveguides $32_3$, $32_4$. Therefore, the first light L1 (wavelength 1.31 μm) and the second light L2 (wavelength 1.49 μm) used in ONU equipment can be separated without polarization dependence.

Since the optical path length difference between the third and fourth optical waveguides $32_3$, $32_4$ is π+2 mπ wavelengths of the first light L1 and 2 mπ wavelengths of the second light L2, the Mach-Zehnder interferometer 30 can perform wavelength separation with a higher extinction ratio than the directional coupler 10 in the first embodiment.

In a plane orthogonal to the direction of light propagation, the third and fourth optical waveguides $32_3$, $32_4$ have cross sectional shapes identical to the cross sectional shapes of the optical waveguides $16_{11}$, $16_{12}$, $16_{21}$, $16_{22}$ in the directional couplers $10_1$, $10_2$. When the Mach-Zehnder interferometer 30 is manufactured by applying semiconductor fabrication technology, masks of the same width can be used for both the first and second directional couplers $10_1$, $10_2$ and the third and fourth optical waveguides $32_3$, $32_4$.

An application of the Mach-Zehnder interferometer 30 will be described with reference to FIGS. 11 and 12.

Figure 11:
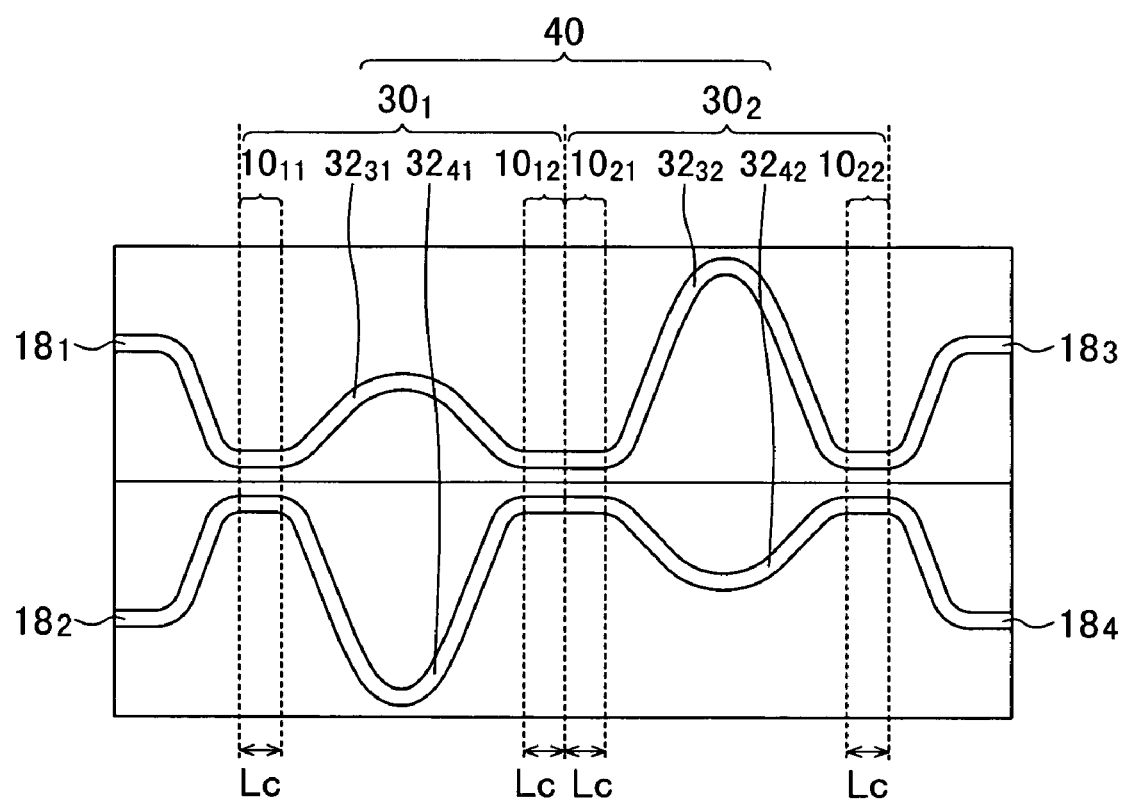
FIG. 11 is a schematic plan view illustrating the structure of an optical device having two Mach-Zehnder interferometers of the type in FIG. 9.

FIG. 11 shows an optical device 40 having a pair of Mach-Zehnder interferometers $30_1$, $30_2$ connected in series between a pair of input optical waveguides $18_1$, $18_2$ and a pair of output optical waveguides $18_3$, $18_4$.

The Mach-Zehnder interferometers $30_1$, $30_2$ have the same structure as the Mach-Zehnder interferometer 30 described above, except that the coupling length Lc of the directional couplers $10_{11}$, $10_{12}$, $10_{21}$, $10_{22}$ is one-fourth La (La/4) instead of one-half La. This value (La/4) is used in order to have the second light L2 output in the cross state after propagation through the four directional couplers.

In the optical device 40, the first Mach-Zehnder interferometer $30_1$ and the second Mach-Zehnder interferometer $30_2$ have equal but opposite optical path length differences. The total optical path length of the single continuous integrally joined optical waveguide formed by the first optical waveguides in the directional couplers $10_{11}$, $10_{12}$, $10_{21}$, $10_{22}$ and the third optical waveguides $32_{31}$, $32_{32}$ in the Mach-Zehnder interferometers $30_1$, $30_2$, is accordingly equal to the total optical path length of the single continuous integrally joined optical waveguide formed by the second optical waveguides in the directional couplers $10_{11}$, $10_{12}$, $10_{21}$, $10_{22}$ and the fourth optical waveguides $32_{41}$, $32_{42}$ in the Mach-Zehnder interferometers $30_1$, $30_2$.

The optical path length difference ΔL is defined as the optical path length of the third optical waveguide minus the optical path length of the fourth optical waveguide. In the first Mach-Zehnder interferometer $30_1$, the optical path length difference is calculated as the optical path length of third optical waveguide $32_{31}$ minus the optical path length of the fourth optical waveguide $32_{41}$, so a negative optical path length difference (−ΔL) is obtained. In the second Mach-Zehnder interferometer $30_2$, the optical path difference is calculated as the optical path length of third optical waveguide $32_{32}$ minus the optical path length of fourth optical waveguide $32_{42}$, so a positive optical path length difference (ΔL) is obtained.

The purpose of this reversal of the sign of the optical path length difference in the first and second Mach-Zehnder interferometers $30_1$, $30_2$ is to improve the wavelength separation performance of the optical device 40, which will be described next with reference to the graph in FIG. 12.

Figure 12:
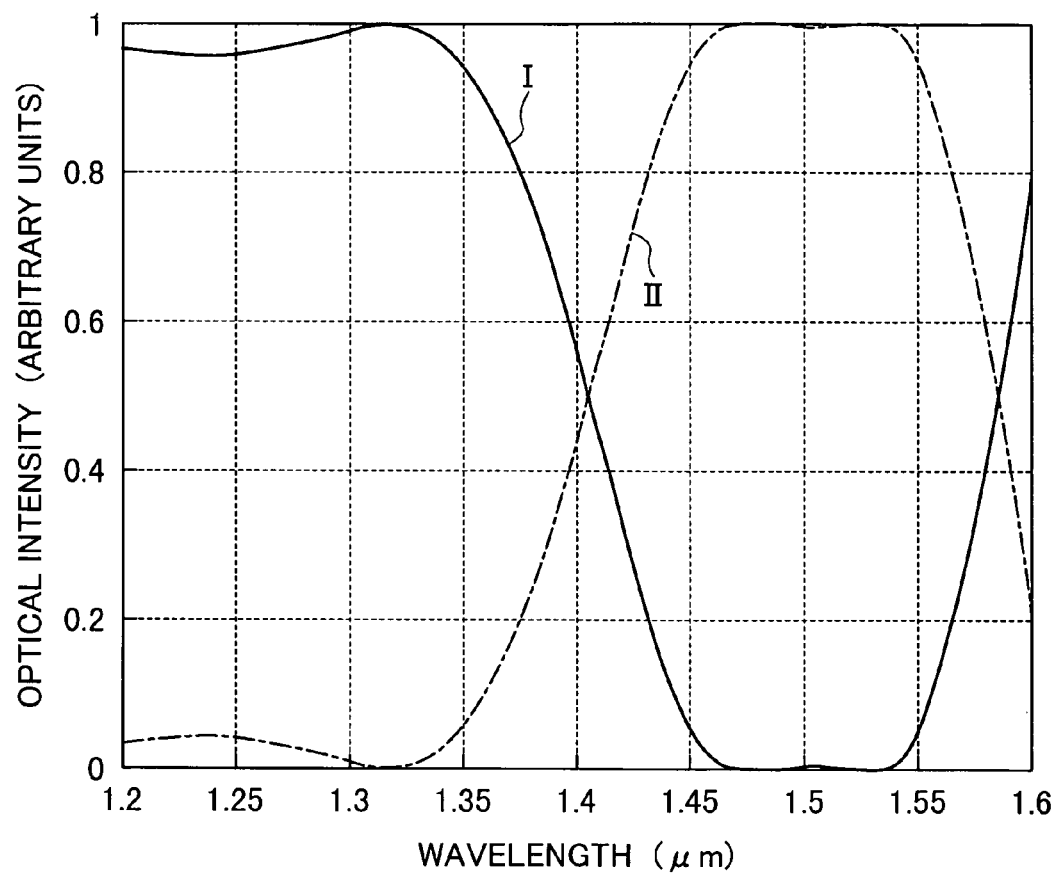
FIG. 12 is a graph illustrating wavelength separation characteristics of the optical device in FIG. 11.

The horizontal axis in FIG. 12 represents wavelength in micrometers, and the vertical axis represents the intensity of light in arbitrary units. Curve I represents the optical intensity of light entering at input optical waveguide $18_1$ of the optical device 40 and exiting from output optical waveguide $18_3$ in the bar state. Curve II represents the optical intensity of light entering at input optical waveguide $18_1$ and exiting from output optical waveguide $18_4$ in the cross state.

Curves I and II were obtained by calculations using the finite element method. In the design conditions of the optical device 40, the order of the interferometer with respect to the second light L2 (wavelength 1.49 μm) is 1.9. The total length of the directional couplers $10_{11}$, $10_{12}$, $10_{21}$, $10_{22}$ is 1.1 times the coupling length.

In FIG. 12, curve I has a peak about 0.14 μm wide centered around 1.3 μm, approximately the wavelength of the first light L1. Curve II has a peak about 0.1 μm wide centered around 1.5 μm, approximately the wavelength of the second light L2

In an optical device using conventional Mach-Zehnder interferometers, which achieve polarization independence by using directional couplers with cross-sectional shapes differing from the cross-sectional shapes of the optical waveguides $32_{31}$, $32_{32}$, $32_{41}$, $32_{42}$ in the interferometer arms, four conventional Mach-Zehnder interferometers connected in series are needed to obtain the level of wavelength separation performance illustrated in FIG. 12.

The optical device 40 in FIG. 11 achieves the same performance with only two Mach-Zehnder interferometers $30_1$, $30_2$.

Third Embodiment

Figure 13:
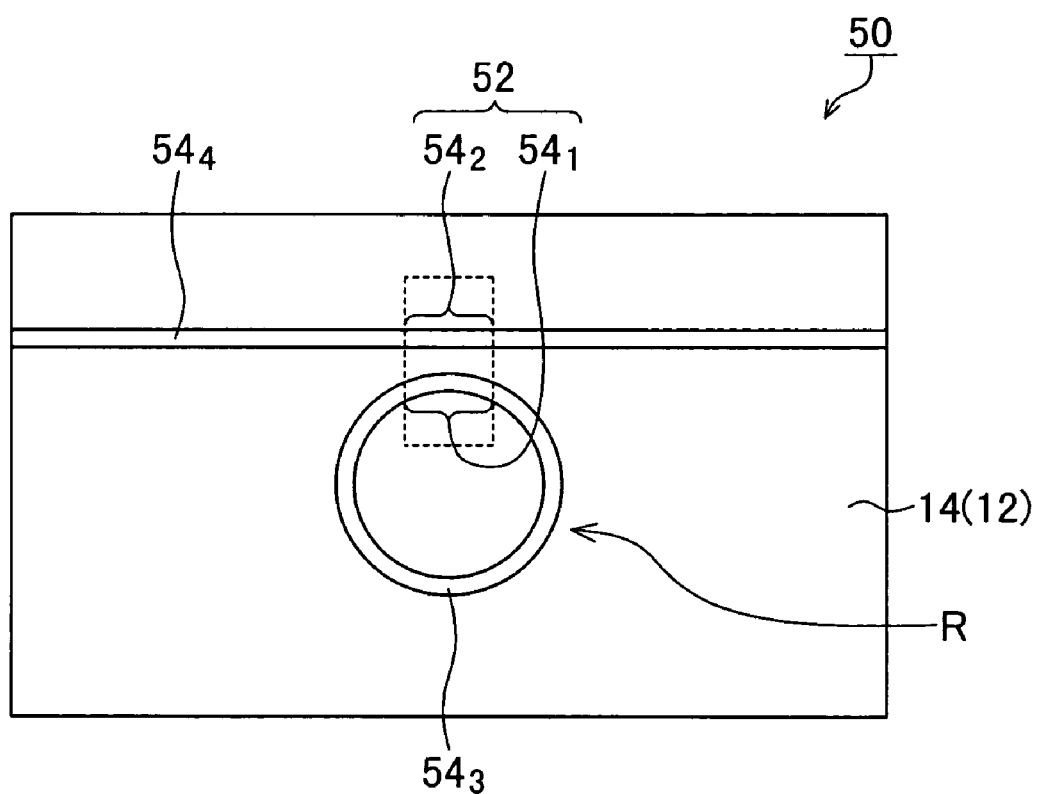
FIG. 13 is a schematic plan view illustrating the structure of a ring interferometer in a third embodiment of the invention.

The optical device in the third embodiment is a ring interferometer, shown in FIG. 13. For clarity, the ring interferometer 50 is indicated by solid lines instead of phantom lines, even though it is embedded in the clad 14 and would not be visible to the eye. As in the preceding embodiments, the clad 14 is formed on a substrate 12 (not visible in this plan view).

The ring interferometer 50 includes a first optical waveguide $54_1$, a second optical waveguide $54_2$, a third optical waveguide $54_3$, and a fourth optical waveguide $54_4$. The first and second optical waveguides $54_1$, $54_2$ form a directional coupler 52. The third optical waveguide $54_3$ forms a loop connecting the two ends of the first optical waveguide $54_1$. The fourth optical waveguide $54_4$ is an extension from both ends of the second optical waveguide $54_2$ for optical input and output.

The first and third optical waveguides $54_1$, $54_3$ are formed integrally and constitute a circular channel optical waveguide, referred to below as an optical ring waveguide R.

The first optical waveguide $54_1$ in the optical ring waveguide R and the second optical waveguide $54_2$ are spaced apart by a distance that allows optical coupling between them and form a polarization independent directional coupler 52 generally similar to the directional coupler described in the first embodiment. The third and fourth optical waveguides $54_3$, $54_4$ are channel waveguides with square cross sections so they are also polarization independent. The ring interferometer 50 accordingly operates without polarization dependence and can be used as a polarization independent optical filter or a polarization independent optical delay element.

Those skilled in the art will recognize that further embodiments and variations are possible within the scope of the invention, which is defined in the appended claims.

What is claimed is:

1. A directional coupler for coupling a mixed light signal including first light with a wavelength of 1.31 micrometers and second light with a wavelength of 1.49 micrometers without polarization dependence, the directional coupler comprising:
a clad; and
a first optical waveguide made of monocrystalline silicon embedded in the clad, for receiving input of the mixed light signal, the first optical waveguide having a first central axis along which the mixed light signal propagates; and
a second optical waveguide made of monocrystalline silicon embedded in the clad at a distance from the first optical waveguide permitting optical coupling of the second light from the first optical waveguide into the second optical waveguide, the first optical waveguide having a second central axis along which the second light propagates, the first and second central axes being mutually parallel; wherein
the clad has a refractive index n with a value in a first range from 1.46 to 2.0;
the first and second central axes are mutually separated by a distance G, the distance G having a value in a second range from 0.6 micrometers to 0.9 micrometers; and
in a first plane orthogonal to the first and second central axes, the first and second optical waveguides have square cross sectional shapes, the square shapes having sides of a length s with a value in a third range from 0.21 micrometers to 0.35 micrometers, the value of the length s being determined from the distance G and the refractive index n.

2. The directional coupler of claim 1, wherein for given values of the distance G and the refractive index n, the length s has a value that gives equal calculated coupling lengths for both transversal electric waves and transversal magnetic waves of the second light.

3. The directional coupler of claim 1, wherein the refractive index n and the length s are related as follows:

$$0.148n - 0.006 < s < 0.148n + 0.054.$$

4. The directional coupler of claim 1, wherein the clad is made of silicon oxynitride.

5. The directional coupler of claim 1, wherein the clad is made of silicon dioxide.

6. The directional coupler of claim 1, wherein the first and second optical waveguides have a length matching a coupling length of the second light.

7. An optical device comprising:
the directional coupler of claim 1;
a third optical waveguide connected to the first optical waveguide of the directional coupler for propagation of the mixed light signal; and
a fourth optical waveguide connected to the second optical waveguide of the directional coupler for propagation of the mixed light signal; wherein
in a second plane orthogonal to the third and fourth central axes, the third and fourth optical waveguides have cross sectional shapes identical to the cross sectional shapes of the first and second optical waveguides.

8. A Mach-Zehnder interferometer comprising:
a first directional coupler and a second directional coupler both identical to the directional coupler of claim 1;
a third optical waveguide interconnecting the first optical waveguide of the first directional coupler and the first optical waveguide of the second directional coupler; and a fourth optical waveguide interconnecting the second optical waveguide of the first directional coupler and the second optical waveguide of the second directional coupler; wherein the third and fourth optical waveguides have cross sectional shapes identical to the cross sectional shapes of the first and second optical waveguides in the first and second directional couplers; and the third and fourth optical waveguides have mutually differing optical path lengths.

9. The Mach-Zehnder interferometer of claim 8, wherein each of the first and second optical waveguides in the first and second directional couplers has a length matching one-half of a coupling length of the second light.

10. An optical device including a plurality of Mach-Zehnder interferometers each comprising:
- a first directional coupler and a second directional coupler both identical to the directional coupler of claim 1;
- a third optical waveguide interconnecting the first optical waveguide of the first directional coupler and the first optical waveguide of the second directional coupler; and
- a fourth optical waveguide interconnecting the second optical waveguide of the first directional coupler and the second optical waveguide of the second directional coupler; wherein
- the third and fourth optical waveguides have cross sectional shapes identical to the cross sectional shapes of the first and second optical waveguides in the first and second directional couplers;
- the third and fourth optical waveguides have mutually differing optical path lengths; and
- the first optical waveguides in the first and second directional couplers in the Mach-Zehnder interferometers and the third optical waveguides in the Mach-Zehnder interferometers are all integrally joined to form a single continuous waveguide having a first length; and
- the second optical waveguides in the first and second directional couplers in the Mach-Zehnder interferometers and the fourth optical waveguides in the Mach-Zehnder interferometers are all integrally joined to form another single continuous waveguide having a second length equal to the first length.

11. The optical device of claim 10, wherein the first optical waveguides in the first and second directional couplers in the Mach-Zehnder interferometers have a total combined length equal to a coupling length of the second light.

12. An optical ring interferometer comprising:
- the directional coupler of claim 1;
- a third optical waveguide connected to the first optical waveguide of the directional coupler for propagation of the mixed light signal, the third optical waveguide having a third central axis, the third optical waveguide having two ends both connected to the first optical waveguide in the directional coupler to form an endless loop; and
- a fourth optical waveguide connected to the second optical waveguide in the directional coupler for input and output of the mixed light signal, the fourth optical waveguide having a fourth central axis; wherein
- in a second plane orthogonal to the third and fourth central axes, the third and fourth optical waveguides have cross sectional-shapes identical to the cross sectional shapes of the first and second optical waveguides of the directional coupler.

13. The optical ring interferometer of claim 12, wherein the fourth optical waveguide extends from both ends of the second optical waveguide in the directional coupler.

* * * * *